United States Patent [19]

Frank et al.

[11] Patent Number: 5,067,222

[45] Date of Patent: Nov. 26, 1991

[54] METHOD OF MANUFACTURING A GUARDED CUTTING EDGE FOR A WRAPPING MATERIAL DISPENSER

[75] Inventors: Armin C. Frank, Philadelphia; Harry E. Sulzer, Perkasie, both of Pa.

[73] Assignee: Mef Co., Inc., North Wales, Pa.

[21] Appl. No.: 577,932

[22] Filed: Sep. 5, 1990

Related U.S. Application Data

[62] Division of Ser. No. 463,597, Jan. 11, 1990, Pat. No. 4,972,984.

[51] Int. Cl.[5] .............................................. B23P 17/00

[52] U.S. Cl. ........................................ 29/411; 29/429; 29/430; 29/432; 29/469.5; 29/521

[58] Field of Search ................. 29/411, 417, 429, 430, 29/432, 469, 469.5, 521

[56] References Cited

U.S. PATENT DOCUMENTS

| | | | |
|---|---|---|---|
| 2,186,381 | 1/1940 | Howe | 29/432 |
| 2,254,558 | 9/1941 | Williams | 29/432 |
| 3,138,658 | 6/1964 | Weimer, Jr. | 29/521 |

*Primary Examiner*—P. W. Echols
*Assistant Examiner*—David P. Bryant
*Attorney, Agent, or Firm*—Dann Dorfman, Herrell & Skillman

[57] ABSTRACT

A dispenser carton for continuous-length material, such as plastic film, includes an integral cutting assembly or a cutting assembly on a separate board which may be fitted into operating position during carton use. A deflectable protective guard or shield for the cutting edge of the assembly normally resiliently rests in a protective posture against and overlapping the cutting edge. It is adapted to be temporarily deflected to facilitate normal cutting of the dispensed material and to be spontaneously returned to its protective posture during non-use of the carton. The guard is a relatively stiff flexible tape sandwiched between the cutting edge and its supporting board stock so that the tape may not be readily removed without destroying the function of the cutting edge.

The preferred method of assembling the cutting assembly consists of supplying a cutter element having a serrated longitudinal edge and a protective guard tape, both in continuous strip form, and feeding the cutter, the guard tape and appropriate board stock longitudinally through an assembly station which stakes the components together as they are passed through the stations.

7 Claims, 3 Drawing Sheets

FIG. 5
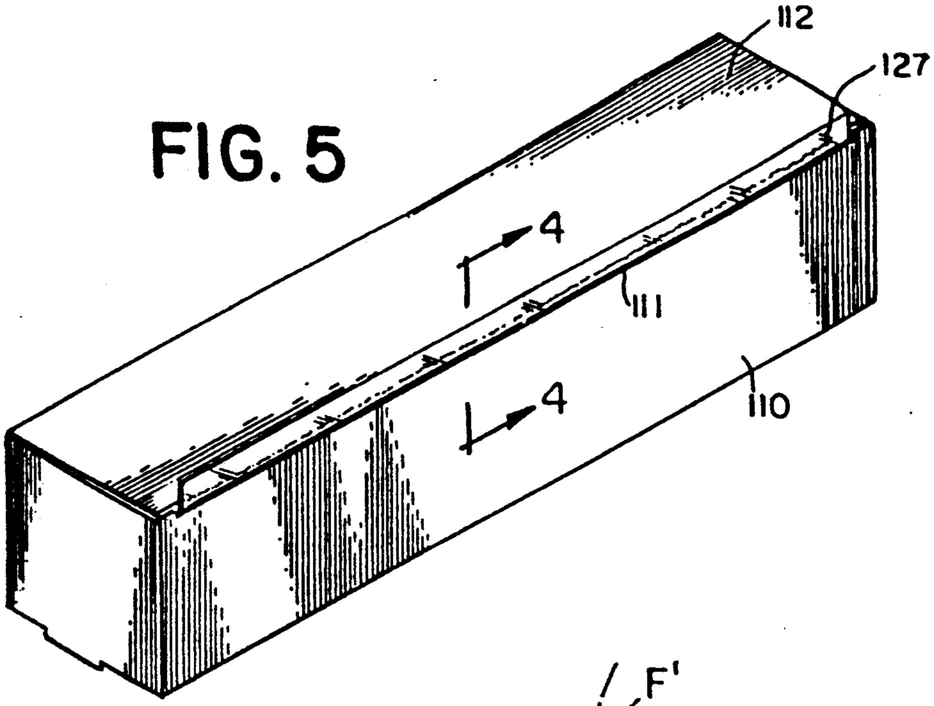
FIG.6
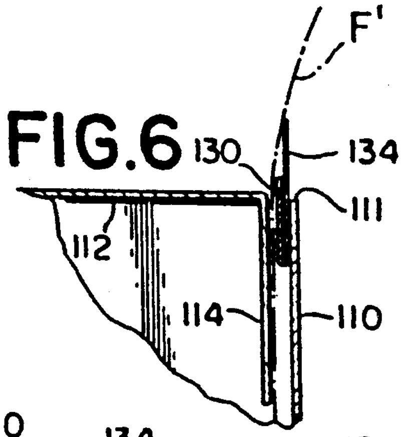
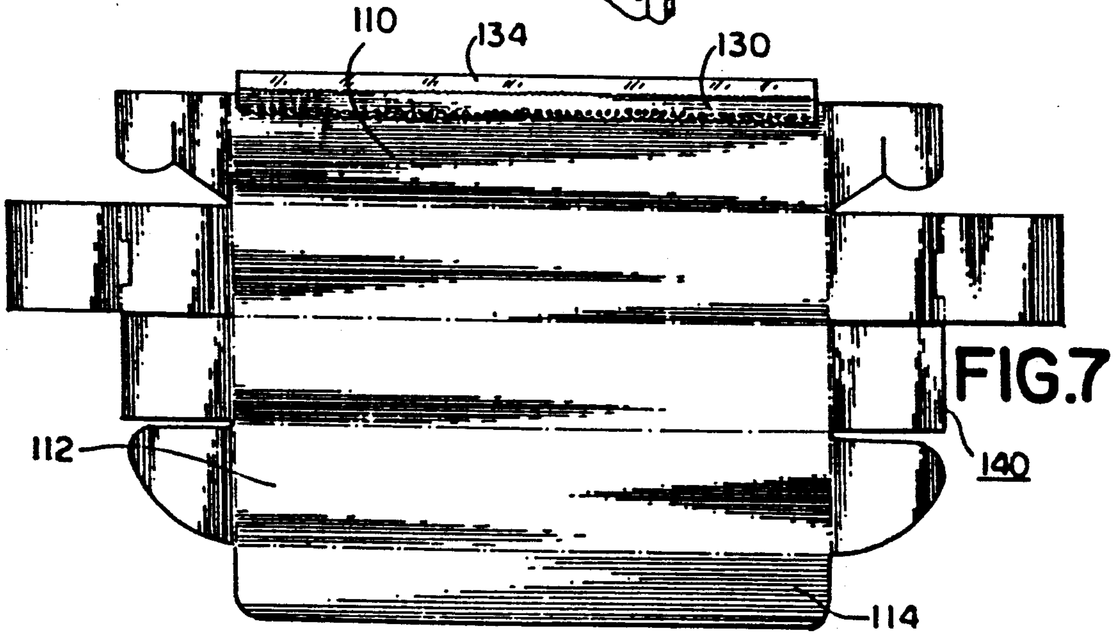
FIG.7

METHOD OF MANUFACTURING A GUARDED CUTTING EDGE FOR A WRAPPING MATERIAL DISPENSER

This is a division of application Ser. No. 07/463,597, filed Jan. 11, 1990, now U.S. Pat. No. 4,972,984, issued Nov. 27, 1990.

FIELD OF THE INVENTION

The present invention relates to a dispensing carton for continuous length material, which carton includes an integral cutting edge bar provided with a deflectable protective guard or shield.

BACKGROUND OF THE INVENTION

Flexible, continuous length wrapping material, such as paper, plastic films and metallic foils are sold in rolls (coiled) form. They are dispensed from a disposable carton, which has an integral, and often separable, cutter bar associated with it, to enable cutting the desired length of the sheet transversely. Commonly used dispensers have overtly arrayed cutting edges that can be very sharp to even casual contact.

For home use, when the sheets will be cut in short lengths, the cartons are designed to be held in one hand, while cutting is actuated by the other, which is a fairly safe dispensing arrangement. However, in commercial uses, much bigger rolls of these film products are dispensed. The carton is usually placed in service sitting in a fixed position and the sheet is pulled from the roll to be transversely cut by an overtly protruding cutter bar, positioned at the upper front face of the film dispenser. The unshielded serrated edge of the cutter bar is sharp and can cause injuries to the user who must repeatedly draw film wrap from the dispensing carton. This occurs because the cutter edges protrude only moderately above the carton surface, so they are not readily perceived by an infrequent and/or inattentive user of the dispensing carton. While certain protective elements have been proposed to shield the user from inadvertent injury, they are only partially effective, and are perceived by the user to impede the repeated efficient use of the cutter bar, or add significant cost to disposable carton and cutter bar production.

One proposed shielding means is disclosed in Wilson et al, U.S. Pat. No. 3,552,614, directed to a discrete, resilient protective shield for the serrated edge of a cutting bar. It is normally biased in a protective overlapping posture relative to the cutter edge. Although it is adjacent to the cutter edge, it may be easily broken off. This shield also adds a major cost to the cutter bar fabrication.

In another approach to the dispenser carton, as is disclosed in U.S. Pat. No. 4,651,911, a cutting blade guard is mounted externally of cutter blade, and is vulnerable to tearing off during use, or to just being torn away by a user to whom it appears to be an unnecessary nuisance.

The metallic cutter strip can be applied directly to an edge of the carton blank or to a separate board which is inserted in the erected carton and becomes an integral part thereof. In current staking machine technology, the board or flat carton blank on which a cutter strip is to be mounted, is fed into a staking machine transversely to the feed of the cutter strip, and when the components are in registry, the machine severs an appropriate length of serrated strip, and stakes it along the longitudinal edge of the board. Such operation does not permit application of a guard. If a guard is to be applied, the staked board assembly passes to a hand assembly operation where an overlapping blade guard element is added. The assembly of a guard to the cutter edge is a significant cost additive.

OBJECTS OF THE INVENTION

It is therefore a principal object of the invention to provide a cutter bar for continuous-length material having an improved integral guard feature serving to protect users from inadvertent contact with the cutting edge.

It is another object of the invention to provide a protected cutter bar assembly where the shield element is permanently anchored to the substrate board and cutter edge, so as to shield the edge but still able to deflect readily to permit severing the material by the cutter bar.

It is still another object of the invention to provide a method for forming a cutting bar assembly which properly registers a substrate board with a protective tape and a metallic strip from continuously fed ribbon, respectively, for assembly into distinct cutter bar units, which are adapted for attachment to and used with dispensers of flexible continuous-length material.

A still added object of the invention is to provide a cutter bar assembly method which permits lengthwise concurrent feed of the cutter bar component elements through an assembly station, providing an assembly having a deflectable shield feature which is tamperproof to prevent inadvertent or unintentional separation of the shield from the cutter bar assembly.

SUMMARY OF THE INVENTION

According to the present invention, there is provided an improved cutter bar assembly with built-in protection for use with conventional dispensing cartons for severable flexible continuous-length sheet wrapping material, hereinafter referred to as "film", intending to embrace plastic film, as well as foil, paper, and similar wrapping products. The invention is especially applicable to cartons used in commercial operations.

More particularly, the present invention provides a protected-cutting-edge dispensing carton for coiled rolls of severable sheet material. The carton has front, rear and dual end panels, and both upper and lower panels for retaining the coiled film material. In one of the illustrated embodiments, the cutter bar assembly includes a flexible protector tape produced as a distinct subassembly, and is operationally positioned and secured adjacent the transverse slot which is provided for drawing out of the film. In a second illustrated embodiment, the protected cutting edge is mounted on the front edge of the carton where the film is dispensed. In either case, the cutter assembly is adapted to selectively contact the emerging film across its width, deflecting temporarily the flexible guard tape which covers the cutting edge, whereby the edge can sever any length of sheet as selected by the operator.

The major operable assembly elements are a planar substrate board pre-cut to a predetermined size suited for use as or as part of a carton mating. Next, is an elongate, flexible protective strip or tape, which is of a length no longer than the final longitudinal dimension of the cutter strip which is positioned coincident with, and overlapping an elongate metallic strip, having a pre-machined, serrated type of cutting edge, and this subassembly is disposed along one longitudinal edge of the substrate board with the underlying board with the protective tape to be fastened between the board and the cutter strip. The protective tape is relatively stiff and normally oriented to rest snugly against, but to extend well beyond the cutting edge; still, it is sufficiently flexible to be readily deflected away by the material withdrawn from the dispenser carton so to permit severing contact with the cutting edge when the material is drawn from the carton slot.

In accordance with the invention, the protective tape is firmly anchored between the board and the cutter strip and so positioned that cutter strip lies between the film to be dispensed and the protective tape. Thus, as the film is withdrawn for the purpose of cutting, it deflects the protective tape and exposes the serrated edge of the cutter strip. During this action, the serrations remain protected since they are covered by the taut film material being dispensed.

The invention also comprises an improved method of forming a plurality of cutter bar assemblies from separately fed, predetermined lengths of container board, and continuous supplies of stiff flexible tape and of serrated metallic strip. The metallic strip is pre-formed with a series of eyelet-type ports. The steps comprise first passing the continuous length, serrated metallic strip and the tape into the nip between an upper rotating feed drum and an opposing slightly spaced-apart support means. The drum is provided with a peripherally disposed, single linear array of equal length spikes, which are adapted to penetrate the metal strip uniformly through the repetitive, close linear sequence of eyelet-type ports in the strip. Each port has a split hollow, multi-point shank emerging from the planar strip surface extending outwardly from the marginal edge of each port in the strip. The codirectional and converging metallic strip and flexible tape make first contact between the drum and guide roll, with the tape being pierced by the eyelet shanks and thus being fastened thereto, so forming a laminated bielement cutter subassembly. This subassembly next passes through a severing station which is actuated to cut off a pre-set length of the laminate subassembly. The cutter subassembly is next moved to a station where it is affixed to a substrate board of precut length.

More precisely, after a previously determined length of the subassembly is cut off and carried out of the severing station, the leading end of the next cutter bar subassembly passes onto the next substrate board in a stream of discrete container boards so that the leading end of the subassembly is positioned to overlie the next board at the proper position along its length. After their convergence and registration, the two move under an opposing set of compression rollers providing a presser and anvil for staking the subassembly to the board by pressing the split shanks into the board.

In a second embodiment, the substrate board is an appropriate part of the carton blank used for forming the dispenser carton. In either embodiment, the severing action and subsequent action of the compression rollers yield discrete complete cutter bar assemblies.

BRIEF DESCRIPTION OF THE DRAWINGS

All of the objects of the invention are more fully set forth hereinafter with reference to the accompanying drawing, wherein:

FIG. 5 is a perspective view of a second film-dispensing carton embodying the invention;

FIG. 6 is a fragmentary sectional view taken on the line 6—6 of FIG. 5; and

FIG. 7 is a face view of the carton blank used to form the carton of FIG. 5.

DETAILED DESCRIPTION OF PREFERRED EMBODIMENTS

Figure 1:
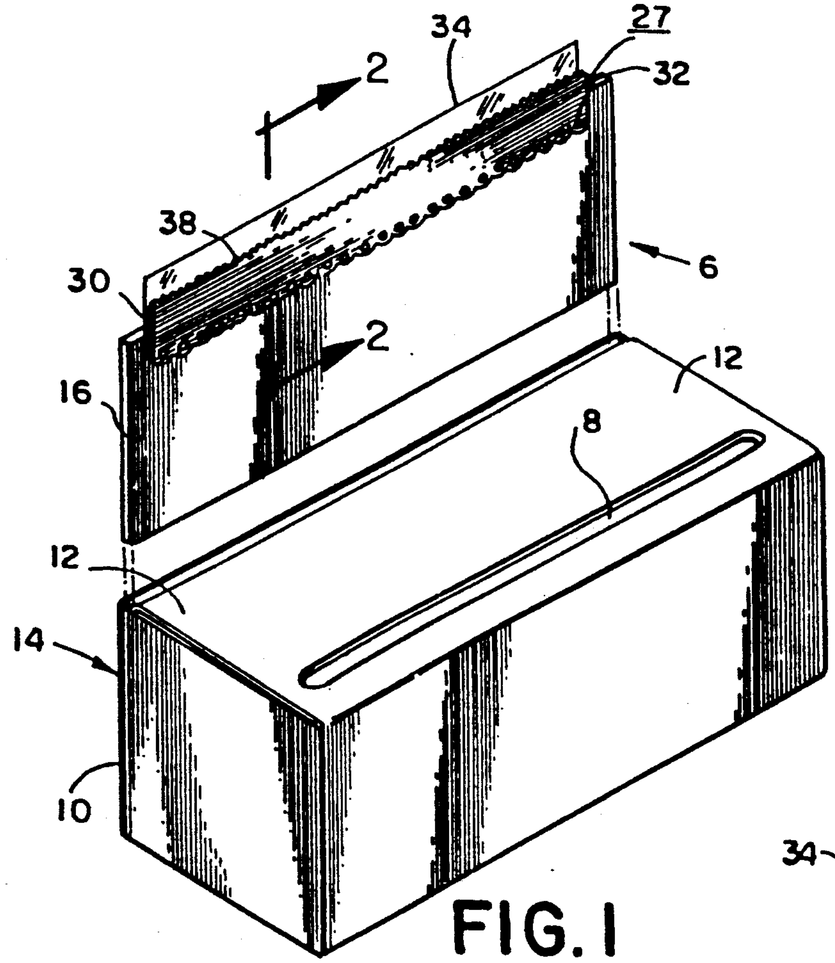
FIG. 1 is a perspective view of a film dispensing carton and its separable, but carton-attachable, cutter bar assembly of the present invention.

Firstly, with reference to FIG. 1, the cutter bar assembly 6 of the illustrated embodiment of the present invention comprises a substrate board 16, in the present case composed of corrugated container board. The board 16 has a length sized so as to slip easily into the space between the upright front wall 10 and upper closure panel 12 of the dispensing carton, generally designated 14. The carton 14 holds a coiled roll of continuous-length material (not shown in FIG. 1), in the present instance flexible film of the type used in food-dispensing establishments which will be drawn as needed through a slot 8 in the top panel 12. The invention is also applicable to other dispensing cartons in which the material is dispensed through the slot formed between the tuck-in flap of the upper panel 12 and the front wall 10 alongside the assembly 6. The width of the cutter bar assembly 6 is such that it projects beyond the planar upper panel 12 of the carton at a sufficient height so as to allow the withdrawn emerging film F to be pulled tautly over the cutting edge for severance (see FIG. 4).

Figure 2:
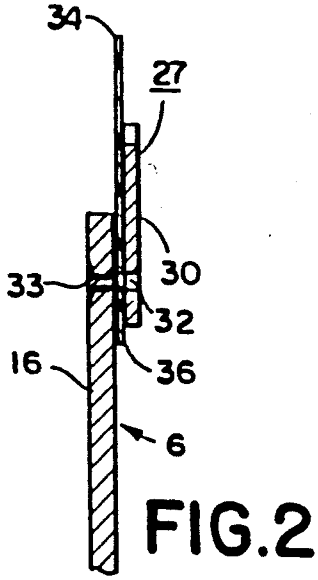
FIG. 2 is a fragmentary, cross-sectional view of the operable part of the cutter bar assembly, taken along line 2—2 of FIG. 1 showing in broken lines the position of the assembly relative to the carton when in use.

The cutter bar assembly 6 extends along the full length of the panel 10, and has on its upper margin a cutter bar subassembly 27 comprising a cutter strip 30 and a protective tape 34. The lower part of the metallic strip 30 presents a repetitive, linear array of punched-out eyelets 32 with inwardly-oriented shanks 33 (FIG. 2). The shanks 33 pass through the stiff flexible protective tape 34 and are staked into substrate board along its upper margin.

The upper edge of metal strip 30 has a cutting edge 38, preferably in the form of uniform serrations, which are provided by machining steps well known in the art and forming no part of the present invention. The metal composition employed should be one that is readily formed into a sheetlike, elongated strip, such as steel sheet metal, and is also adapted to the inclusion of both the one edge serrations 38 and opposing serial eyelets 32 for component fastening (staking), as earlier described.

Though any suitable stiff flexible sheet material may be selected to form elongate protective tape 34, one quite suitable material is MYLAR Type A, 200 gauge, plastic film of the E. I. DuPont Company of Wilmington, Del. Mylar is a durable, water-repellant and transparent elastomeric film of polyethylene terephthalate resin, and has sufficient stiffness to protect the cutter edge, but is flexible enough to bend out of the way to allow the edge to sever the dispensed film. The preferred material is anti-static, and is sufficiently friction-free to avoid interfering with the passage of the film across it as the film is drawn from the dispenser. Other resins that show like physical properties may be useful. Tape transparency is optional, but desirable, so to allow the carton user to observe the serrated edge when looking from either side of the cutter bar.

The substrate board 16 on which the serrated strip 30 and protective tape 34 are mounted is conveniently of a standard container board material, such as corrugated container board having whatever strength is needed.

Figure 4:
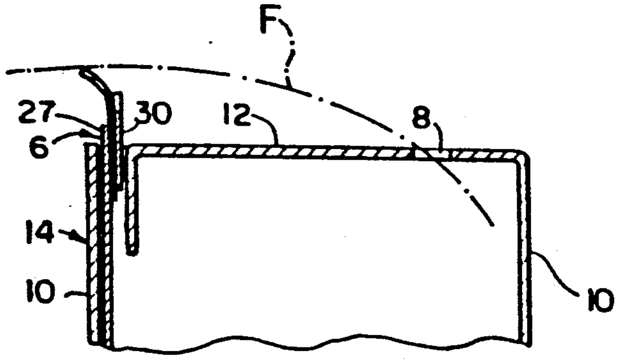
FIG. 4 is a fragmentary thumbnail sketch showing the cutter bar assembly in use.

As shown in the cross-sectional view of FIG. 2, the protective tape 34 is sandwiched between the substrate board 16 and the cutter strip 30, and it extends appreciably beyond the upper marginal edge of the board and beyond the upper cutting edge 38. The projection of the tape beyond the cutting edge and the position of the cutting edge beyond the edge of the substrate board must be sufficient to permit the tape to bend away from the edge and expose it for severing the film, as shown in FIG. 4. The strip 30 overlies tape 34, and overlaps the board 16 so as to provide an adequate staking and reinforcing area along its margin. The upper serrated edge 38 is positioned below the upper edge of tape 34, which normally rests snugly against it. By deflecting the tape leftwardly as seen in FIG. 4, from the "at rest" position seen in FIG. 2, an emerging film sheet (shown at F) exposes the serrated edge 38 so as to sever the film transversely, as the latter is pulled downwardly over the cutter bar.

The tape 34 is securely sandwiched between the board 16 and the cutter bar 30 so that when positioned for use, the tape cannot be inadvertently removed from its protective position overlying the cutting edge of the strip 30, nor can it be intentionally torn away without tearing away the cutter strip itself, rendering the cutter bar assembly ineffective for use as intended. Thus, the present invention is tamper-proof to the extent that it inhibits tampering with the protective feature provided by the tape 34.

Figure 3:
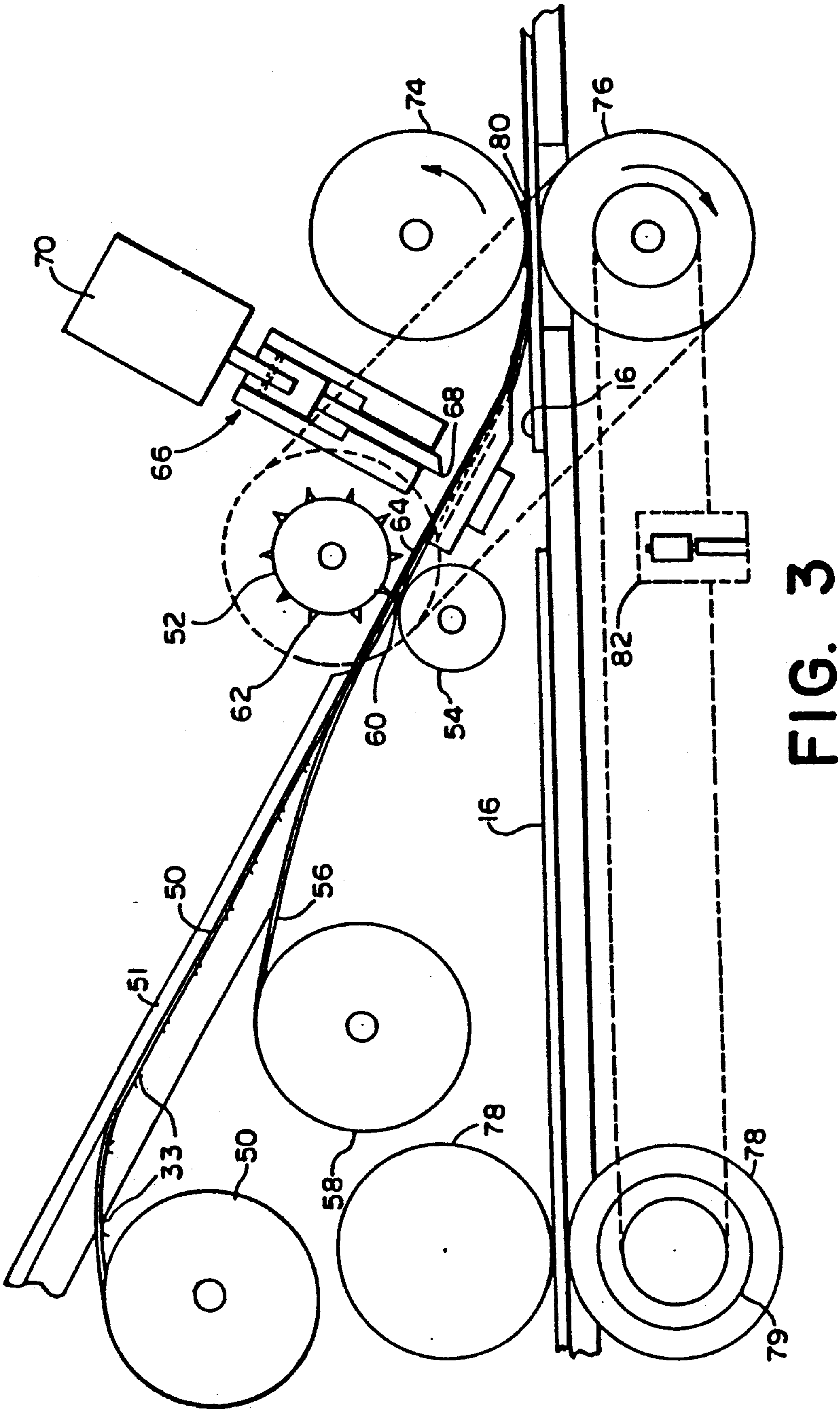
FIG. 3 is a schematic view of the preferred means for assembly and staking of serrated strip, flexible guard tape and of substrate board into the discrete cutter bar assembly depicted in FIG. 1.

Referring now to FIG. 3, the preferred method of forming a plurality of cutter bar assemblies is schematically illustrated therein. This may be done using a supply of finite, uniform lengths of container board as the boards which will form the substrate 16, a continuous length 56 of flexible shielding tape forming the tape 34 (FIG. 1) and a continuous length 50 of serrated metallic strip for producing the cutter strip 32 (FIG. 1), as will be described.

A continuous ribbon of the pre-serrated metal strip 50 is directed into a guide 51 in a declining path into the nip area 60, the upper part of which is a rotating driven feed roller 52, and the lower of which is the support means of guide 51. In the drawing, a lower support roll 54 backs up the feed roller 52. A continuous flexible tape 56 is drawn off from coil 58 and converges codirectionally with the metal strip 50 into the nip. The upper roll 52 is provided with a peripherally disposed, single linear array of spikes 62, which penetrate sequentially through a repetitive linear sequence of eyelet-type openings 32 (see FIG. 1) in the strip 50, and thus serves to drive metal strip 50 forward. Each eyelet 32 forms a hollow, multi-point shank 33 extending outwardly, which is pressed through the converging protective tape 56 in nip area 60.

As the codirectional and converging metallic strip 50 and tape 56 make forced contact in the nip area 60, the tape 56 is pierced by the shank points and is thereby fastened to the strip 50. This forms a mechanically laminated subassembly 64, which passes through a severing station 66, that is operated to cut off pre-set lengths of the laminate subassembly 64 to form the previously-described subassembly 27 of a length predetermined by the overall longitudinal dimensions intended for the final cutter bar assembly 6. A preferred metering control determines the length of each subassembly 27 by counting the eyelets advanced by the spikes 62. The severing station 66 includes a cutting blade 68, actuated by an electrical or mechanical means 70, activated by appropriate control means, as described hereinafter.

Next, the severed cutter subassembly 27, along with a board 16 from the feed roller 78 are passed between opposed rollers 74 and 76 having a nip 80. The roll 74 serves as an adjustable compression roller and the feed roll 76 serves as an anvil to compress the laminated strip 27 against the underlying board 16 and drive the downwardly facing multi-point shanks 33 into the board 16 and to become staked thereto. The laminated strip subassembly 27 is aligned laterally so that it will overlap and be secured along one longitudinal margin of the container board, in the manner shown in FIGS. 1 and 2.

The rolls 74 and 76 are driven concurrently with the roll 52 so as to insure proper coordinated feeding of the subassembly 27 into the nip 80 at the same rate of travel as the board 16 through the nip 80. The feed roll 52 is actuated through a clutch mechanism which is coupled to the actuator 70 of the severing station so as to interrupt feeding of the assembly through the severing station at the time when the severing station is actuated to cut off the subassembly strip. The feed roll 52 is coordinated with the severing station 66 to cut off the subassembly 64 at a preselected point along its length which insures that the severing of the cutter bar is on a proper line relative to the series of eyelets 32 and the serrations of the cutting edge 38. Preferably, the controls for the feed and severing station are such that the severing station is actuated after the position of the cutter strip in the severing station has been adjusted to a preselected point prior to actuation of the severing device, to give a precision cutoff of the cutter strip as desired. The advance of the feed roll 52 is arrested by disengagement of a clutch from the common drive so that the synchronism between the drive of the feed roll 52 with the drive of the assembly rolls 74 and 76 is not lost.

Preferably, the next board 16 is fed into the machine a time interval after the passage of the trailing end of the previous board through the machine. In the present instance, a sensing device 82 is provided which is triggered by the leading end of the next board to initiate feed of the subassembly strip 27 in timed relation to the board's being fed into the nip 80 of the rollers 74 and 76. The feed is such so that the leading end of the strip registers in predetermined relationship to the leading end of the board. The rotation of the rollers 74 and 76 effects the assembly of the subassembly 27 to the underlying board 16 and advances the assembled cutter assembly through the machine. The machine may be set to maintain operation of the feed for a preselected time period to permit the entire length of the subassembly to be staked along the length of the board edge 16. After the predetermined length of subassembly has been fed through the severing station, the controls interrupt the operation of the feed roll 52 and actuate the severing means to effect a precision cut of the subassembly to form the trailing end of the subassembly which is then drawn through the assembling station with the trailing end of the board.

The boards 16 are advanced into the nip 80 by feed rolls 78 which are driven synchronously with the roll 76. An override clutch 79 enables the boards 16 to be arrested independently of the roll 76. The longitudinal feeding of the board 16, the tape, and the cutter strip provides a mechanism which is readily adapted to handle boards of differing lengths and configurations.

Ancillary equipment is employed.(not shown) that serves for adjusting the severing of the cutter bar subassembly so as to match the lengths used for various carton sizes. Where the severing mechanism is preset to a preselected length, the preselection may be changed to accommodate precut boards of different sizes.

FIGS. 5 and 6 illustrate a guarded cutter bar assembly incorporated in the dispensing carton. In this embodiment, the carton has a front panel 110, and a lid 112 hinged to a rear panel (not shown) and having a flap 114 adapted to be tucked inside the front panel 110. The carton houses a roll of film which may be dispensed through a slot formed between the flap 114 and the front wall 110, as shown in broken lines at F' in FIG. 6.

A guarded cutter bar subassembly 127 is secured inside the front flap so as to project above its upper margin, as shown. The subassembly 127 includes a cutter bar 130 and a protective tape 134. When the carton is erected, as shown in FIG. 6, the cutting edge of cutting bar 130 extends above the top edge of the front panel 110, and the tape 134 extends above the cutting edge. In the present case, the top edge of the panel 110 is recessed as shown at 111 in FIG. 5 to enable the cutting edge to be positioned below the plane of the lid 112. The projection of the cutting edge and the top of the tape above the edge 111 is selected to enable the tape to be deflected away from the cutting edge in use.

FIG. 7 illustrates the blank 140 used to form the carton shown in FIG. 5. It is noted that the cutter strip 130 is staked to the panel to capture the tape 134 between the strip 130 and the panel 110. The blank has the usual score lines and locking tabs to enable it to be set up to form the dispensing carton.

The apparatus of FIG. 3 may be used to assemble the blank 140. The feed rolls 78 are used to advance each blank into the nip 80 of the presser roll 74 and anvil roll 76. After passage of the leading edge of the blank is sensed by the sensor 82, a time delay actuates the clutch of the feed roll 52 to advance the subassembly strip 64 into the nip 80 with proper timing to register the leading edge of the strip with the leading end of the offset edge 111 of the front panel. When the desired length of strip 64 has been fed through the severing station, the feed is interrupted and the subassembly strip is cut off to allow the guarded cutter subassembly 127 to be attached along the full length of the offset edge portion 111.

The foregoing embodiments of the assembly each provides a cutter bar assembly with an integral protective guard that is economical to fabricate, consistent in its operable features and durable enough for use through the many cycles of film drawing and tear-off in commercial cartons.

While particular embodiments of the present invention have been herein illustrated and described, this is not intended to limit the invention to such exemplary disclosure, but changes and modifications may be conceived of and made thereto which are within the scope of the following claims.

We claim:

1. A method of forming a plurality of cutting bar assemblies from container board stock having a free edge and continuous lengths of flexible tape and metal strip, said metal strip having a cutting edge and a series of hollow shanks projecting downwardly from one surface of the strip along its length, said hollow shanks defining perforations in said surface, said method comprising:

(a) passing the flexible tape having two side edges into a nip in converging and co-directional underlying contact with the cutting edge and the shanks of said metallic strip with one side edge of the tape extending as a free edge beyond said cutting edge of the metal strip so that the tape will be pierced by said shanks and be advanced concurrently with the metallic strip, thus forming a continuously laminated cutting bar subassembly, (b) advancing the subassembly by a rotary feed roll having spikes and a support, so that the spikes engage the series of perforations of said strip and control the advance of said strip;

(c) passing the laminated subassembly through severing means into an assembly station;

(d) passing said container board stock into said assembly station with the free edge thereof in underlying relation to said laminated subassembly, said assembly station having an anvil and pressure means to drive said shanks into said board stock and against said anvil causing the fastening of the subassembly to the board stock along said free edge of the board stock with the flexible tape positioned between the strip and the board stock but with the cutting edge of the strip positioned beyond the edge of the board stock and the free edge of the tape positioned beyond said cutting edge; and (e) operating said severing means and feed roll to sever the laminated subassembly and interrupt the feed of said subassembly to produce a free trailing end of said subassembly which is carried into said assembly station for fastening the subassembly to the board stock.

2. The method of claim 1 wherein the metallic strip is made of sheet metal and is serrated to produce said cutting edge and is punctured adjacent its opposing longitudinal edge to provide split metallic shanks, said pressure means and anvil operating in the assembly station to drive said shank against said anvil and displace the split ends of said shanks laterally into the board.

3. The method of claim 1 wherein the tape is stiff flexible film of polyethylene terephthalate resin and is positioned relative to the board edge and the cutting edge to be deflected away from the cutting edge in use.

4. The method of claim 1 wherein said board is fed into the station in the same direction as the feed of said laminated subassembly, said feed of the subassembly being initiated by entry of said board into said assembly station and being interrupted after passage of a predetermined length of said assembly through said severing means.

5. The method of claim 4 wherein said severing means is actuated after interruption of said subassembly feed to sever the subassembly at a preselected distance along the length of said strip.

6. The method of claim 5 wherein said feed of the subassembly into said assembly station is controlled to position the leading end of said subassembly at a predetermined point relative to leading edge of the container board stack.

7. The method of claim 4 wherein said anvil and pressure means comprise a pair of opposed rollers defining a nip therebetween, said opposed rollers rotating about parallel axes transverse to the direction of feed of the laminated subassembly, and said steps of passing the laminated subassembly and the container board stock into said assembly station said subassembly and said board stock into and through the nip of said opposed rollers as they rotate to cause the fastening of the subassembly to the stock.

* * * * *

UNITED STATES PATENT AND TRADEMARK OFFICE
CERTIFICATE OF CORRECTION

PATENT NO. : 5,067,222

DATED : November 26, 1991

INVENTOR(S) : Armin C. Frank; Harry E. Sulzer

It is certified that error appears in the above-identified patent and that said Letters Patent is hereby corrected as shown below:

Column 10, line 2, after "station" insert --includes feeding--.

Signed and Sealed this

Twenty-seventh Day of April, 1993

*Attest:*

MICHAEL K. KIRK

*Attesting Officer* *Acting Commissioner of Patents and Trademarks*